United States Patent
Erbito, Jr.

(10) Patent No.: US 7,369,419 B2
(45) Date of Patent: May 6, 2008

(54) VOLTAGE CONVERTER

(75) Inventor: Rogelio L Erbito, Jr., Singapore (SG)

(73) Assignee: Vanguard International Semiconductor Corporation, Hsinchu (TW)

( * ) Notice: Subject to any disclaimer, the term of this patent is extended or adjusted under 35 U.S.C. 154(b) by 126 days.

(21) Appl. No.: 11/480,378

(22) Filed: Jul. 5, 2006

(65) Prior Publication Data

US 2008/0007981 A1    Jan. 10, 2008

(51) Int. Cl.
*H02M 3/07* (2006.01)
(52) U.S. Cl. ............................ 363/60; 327/536
(58) Field of Classification Search .............. 363/59, 363/60; 327/536
See application file for complete search history.

(56) References Cited

U.S. PATENT DOCUMENTS

| | | | | |
|---|---|---|---|---|
| 5,668,710 A | * | 9/1997 | Caliboso et al. | 363/60 |
| 5,870,295 A | * | 2/1999 | Watanabe | 363/60 |
| 5,877,948 A | * | 3/1999 | Dijkmans | 363/60 |
| 6,169,673 B1 | * | 1/2001 | McIntyre et al. | 363/59 |
| 6,522,192 B1 | * | 2/2003 | Sander | 327/536 |
| 2003/0058666 A1 | * | 3/2003 | Myono | 363/59 |

* cited by examiner

Primary Examiner—Jeffrey Sterrett
Assistant Examiner—Stuart Hansen
(74) Attorney, Agent, or Firm—Birch, Stewart, Kolasch & Birch, LLP

(57) ABSTRACT

A voltage converter comprises an input terminal receiving a DC input voltage, an output terminal outputting an output voltage, a first switch coupled between a first node and the input terminal, a second switch coupled between the input terminal and a second node, a first capacitor coupled between the first node and the second node, a third switch coupled between the second node and ground, a fourth switch coupled between a third node and ground, a first electrical device coupled between the third node and the input terminal, a load capacitor coupled between ground and the output terminal, a second electrical device coupled between the first node and the output terminal, a second capacitor coupled between the third node and a fourth node, a fifth switch coupled between the first node and the fourth node, and a sixth switch coupled between the second node and the fourth node.

17 Claims, 16 Drawing Sheets

VOLTAGE CONVERTER

BACKGROUND OF THE INVENTION

1. Field of the Invention

The invention relates to a voltage converter. In particular, the invention relates to a multiphase, multistage voltage converter.

2. Description of the Related Art

FIG. 1 shows conventional three stage two-Phase voltage doubler (TPVD) 100 comprising capacitors C101, C102, C103, C104 and C105, loading capacitor $C_{load}$ and switches 101~112. Input terminal 110 receives a direct current (DC) input voltage Vin. Output terminal 120 outputs an output voltage Vout. Switch 101 is coupled between node 131 and input terminal 110. Switch 102 is coupled between nodes 131 and 133. Switch 103 is coupled between input terminal 110 and node 132. Switch 104 is coupled between node 132 and ground GND. Capacitor C101 is coupled between nodes 131 and 132. Capacitor C102 is coupled between node 133 and ground GND. Switch 105 is coupled between nodes 133 and 134. Switch 106 is coupled between nodes 134 and 136. Switch 107 is coupled between nodes 133 and 135. Switch 108 is coupled between node 135 and ground GND. Capacitor C103 is coupled between nodes 134 and 135. Capacitor C104 is coupled between node 136 and ground GND. Switch 109 is coupled between nodes 136 and 137. Switch 110 is coupled between node 137 and output terminal 120. Switch 111 is coupled between nodes 136 and 138. Switch 112 is coupled between node 138 and ground GND. Capacitor C105 is coupled between nodes 137 and 138. Capacitor $C_{load}$ is coupled between output terminal 120 and ground GND.

Switches 101, 104, 105, 108, 109 and 112 are turned on and switches 102, 103, 106, 107, 110 and 111 are turned off in first phase φ1. Switches 102, 103, 106, 107, 110 and 111 are turned on and switches 101, 104, 105, 108, 109 and 112 are turned off in second phase φ2. The voltage level of node 131 is charged to input voltage Vin during first phase φ1, and to double input voltage 2 Vin during second phase φ2. The voltage level of node 132 is zero during first phase φ1 and Vin during second phase φ2. Therefore, the voltage level of node 133 is charged to double input voltage 2 Vin. Similarly, the voltage level of node 136 is charged to four times input voltage 4 Vin and the voltage level of loading capacitor $C_{load}$ is charged to eight times input voltage 8 Vin. The voltage transfer gain of three stages TPVD 100 is eight. In high current application, capacitors must have high capacitance. However, such capacitors can't be implemented in the voltage converter chip, thus external capacitors are required with corresponding pin increase and increased size, resulting in high cost and more space requirements.

BRIEF SUMMARY OF THE INVENTION

In order to solve the above-mentioned problem, the invention provides a voltage converter. The voltage converter comprises an input terminal receiving a DC input voltage, an output terminal outputting an output voltage, a first switch coupled between a first node and the input terminal, a second switch coupled between the input terminal and a second node, a first capacitor coupled between the first node and the second node, a third switch coupled between the second node and ground, a fourth switch coupled between a third node and ground, a first electrical device coupled between the third node and the input terminal, a load capacitor coupled between ground and the output terminal, a second electrical device coupled between the first node and the output terminal, a second capacitor coupled between the third node and a fourth node, a fifth switch coupled between the first node and the fourth node, and a sixth switch coupled between the second node and the fourth node.

In addition, the invention provides a charge pump circuit comprising an input terminal receiving a DC input voltage, an output terminal outputting an output voltage, a first switch coupled between a first node and the input terminal, a second switch coupled between the input terminal and a second node, a first capacitor coupled between the first node and the second node, a third switch coupled between the second node and ground, a fourth switch coupled between a third node and ground, a first switch device coupled between the third node and the input terminal, a load capacitor coupled between ground and the output terminal, a second switch device coupled between the first node and the output terminal, a second capacitor coupled between the third node and a fourth node, a fifth switch coupled between the first node and the fourth node, and a sixth switch coupled between the second node and the fourth node.

In addition, the invention provides a voltage lifter converter comprising an input terminal receiving a DC input voltage, an output terminal outputting an output voltage, a first switch coupled between a first node and the input-terminal, a second switch coupled between the input terminal and a second node, a first capacitor coupled between the first node and the second node, a third switch coupled-between the second node and ground, a fourth switch coupled between a third node and ground, an inductor coupled between the third node and the input terminal, a load capacitor coupled between ground and the output terminal, a load resistor coupled between ground and the output terminal, a diode coupled between the first node and the output terminal, a second capacitor coupled between the third node and a fourth node, a fifth switch coupled between the first node and the fourth node, and a sixth switch coupled between the second node and the fourth node.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
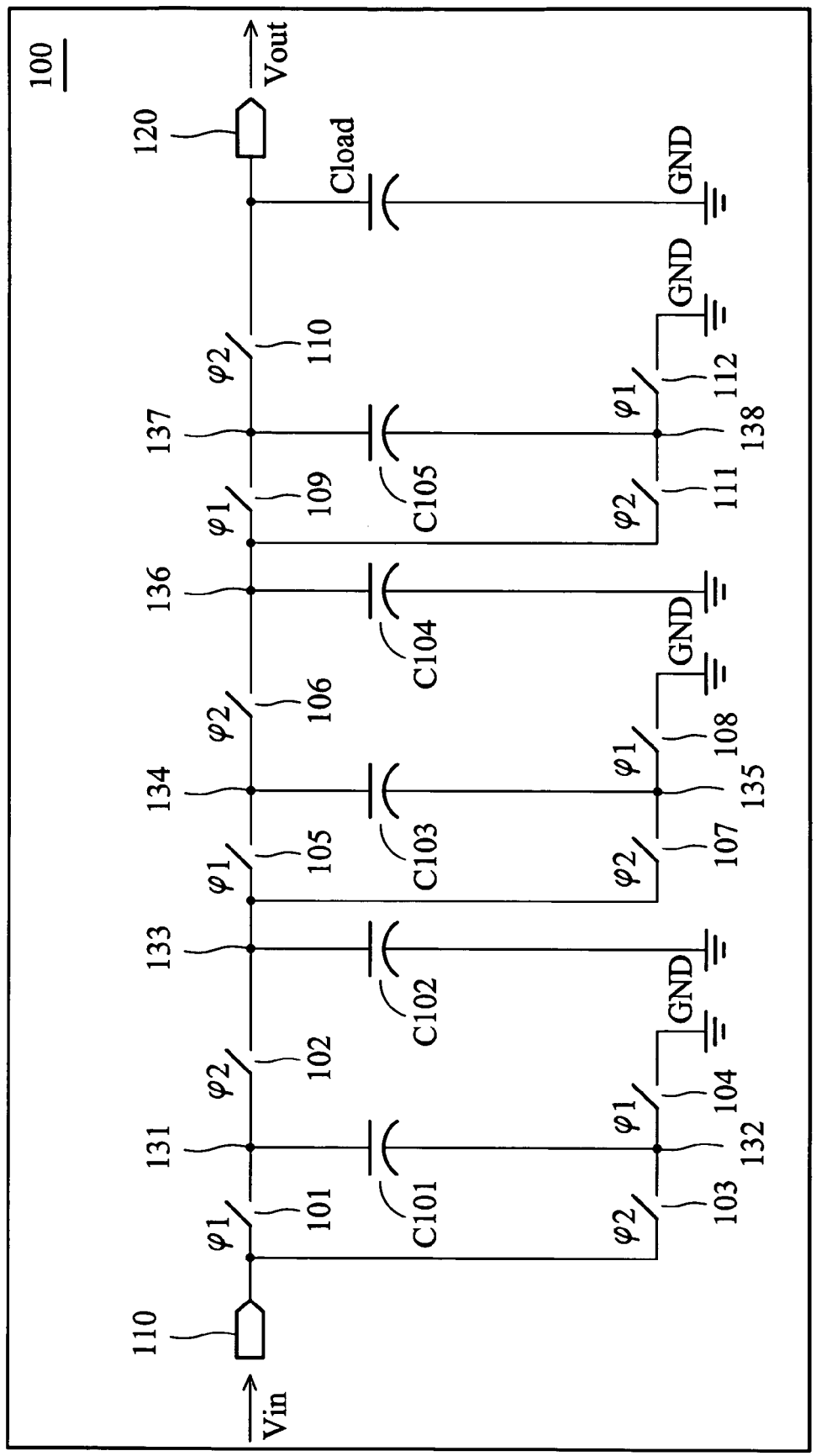
FIG. 1 shows a three stage two-Phase voltage doubler (TPVD)
Figure 2:
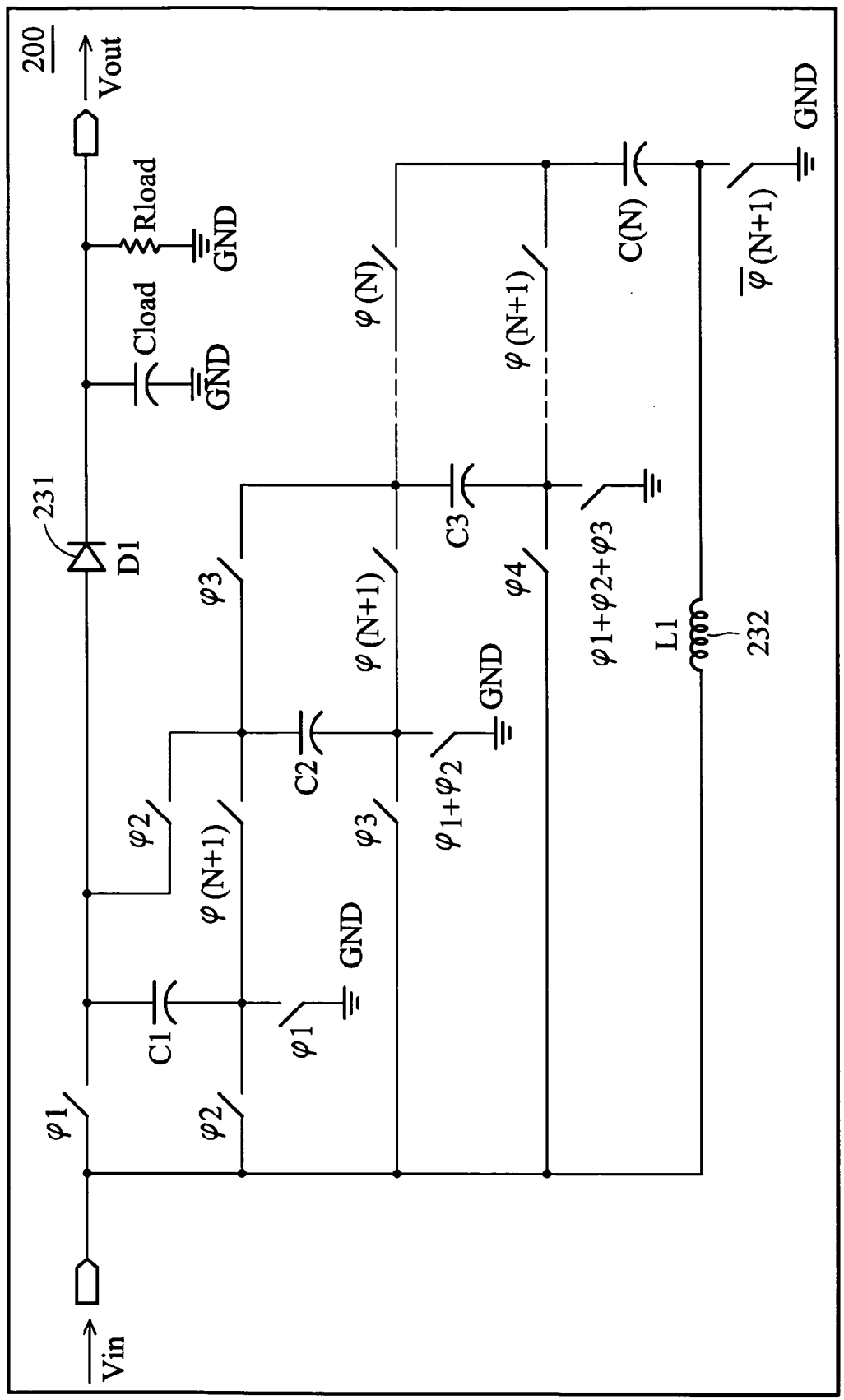
FIG. 2 shows a multiphase multistage voltage lifter converter according to an embodiment of the invention.

FIG. 2 shows a multiphase multistage voltage lifter converter (MMVLC) 200 according to an embodiment of the invention. MMVLC 200 comprises N capacitors (C1, C2, C3 ... C(N)), loading capacitor $C_{load}$, (4N−2) switches, diode 231 and inductor 232. The voltage transfer gain Av of MMVLC 200 is:

$$Av = \frac{Vo}{Vin} = \frac{N(N+1)}{2} + \frac{1}{1-k} \text{ in } (N+1) \text{ phases}$$

where k is the duty cycle of the converter governed by $$k = \frac{t1 + t2 + t3 + \ldots t(n)}{t1 + t2 + t3 + \ldots t(n) + t(n+1)}$$

and the minimum numerical value of N is two. Parameters (t1, t2, t3 ... t(n), t(n+1)) are discussed in detail as follows.

Figure 3:
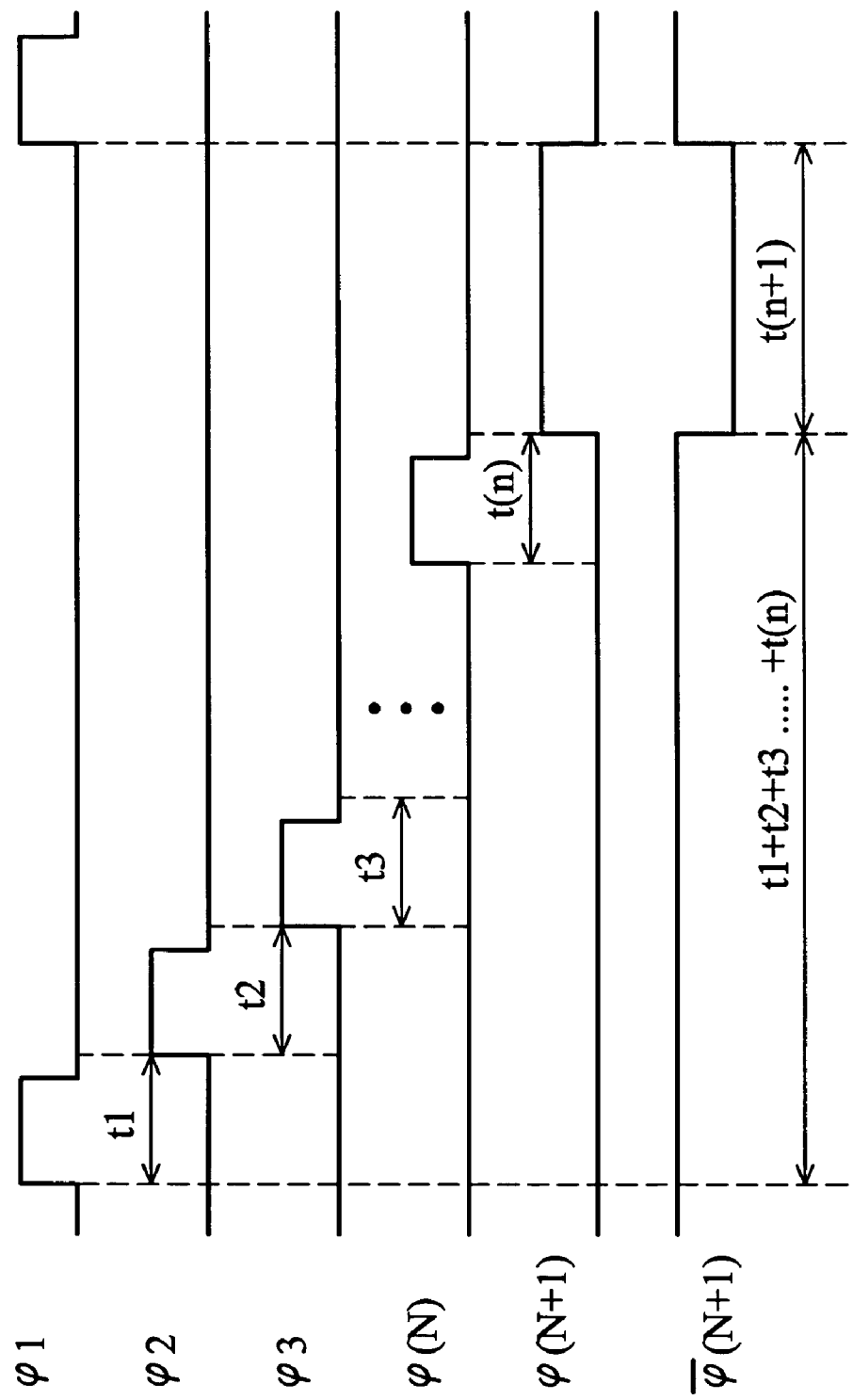
FIG. 3 is a timing diagram illustrating control signals (φ1, φ2, φ3 ... φ(N), φ(N+1), $\overline{\phi}$(N+1)) of MMVLC of FIG. 2.

FIG. 3 is a timing diagram illustrating control signals (φ1, φ2, φ3 ... φ(N), φ(N+1), $\overline{φ}$(N+1)) of MMVLC 200. The switches controlled by control signal φ1 are turned on when control signal φ1 is at high voltage level, as are other switches, turned on when their respective control signals are at high voltage level. In addition, diode 231 is conductive when control signal φ(N+1) is at high voltage level. Control signal (φ1, φ2, φ3 ..., or φ(N)) may be at high voltage level (phase 1, phase 2 ..., or phase (N)) as long as one duration (t1, t2, t3 ..., or t(n)) or may be shorter than one duration (t1, t2, t3 ..., or t(n)). As shown in FIG. 3, durations (t1, t2, t3 ... t(n)) are all equal, while duration t(n+1) may be equal, shorter or larger than any of the durations (t1, t2, t3 ... t(n)).

Figure 4:
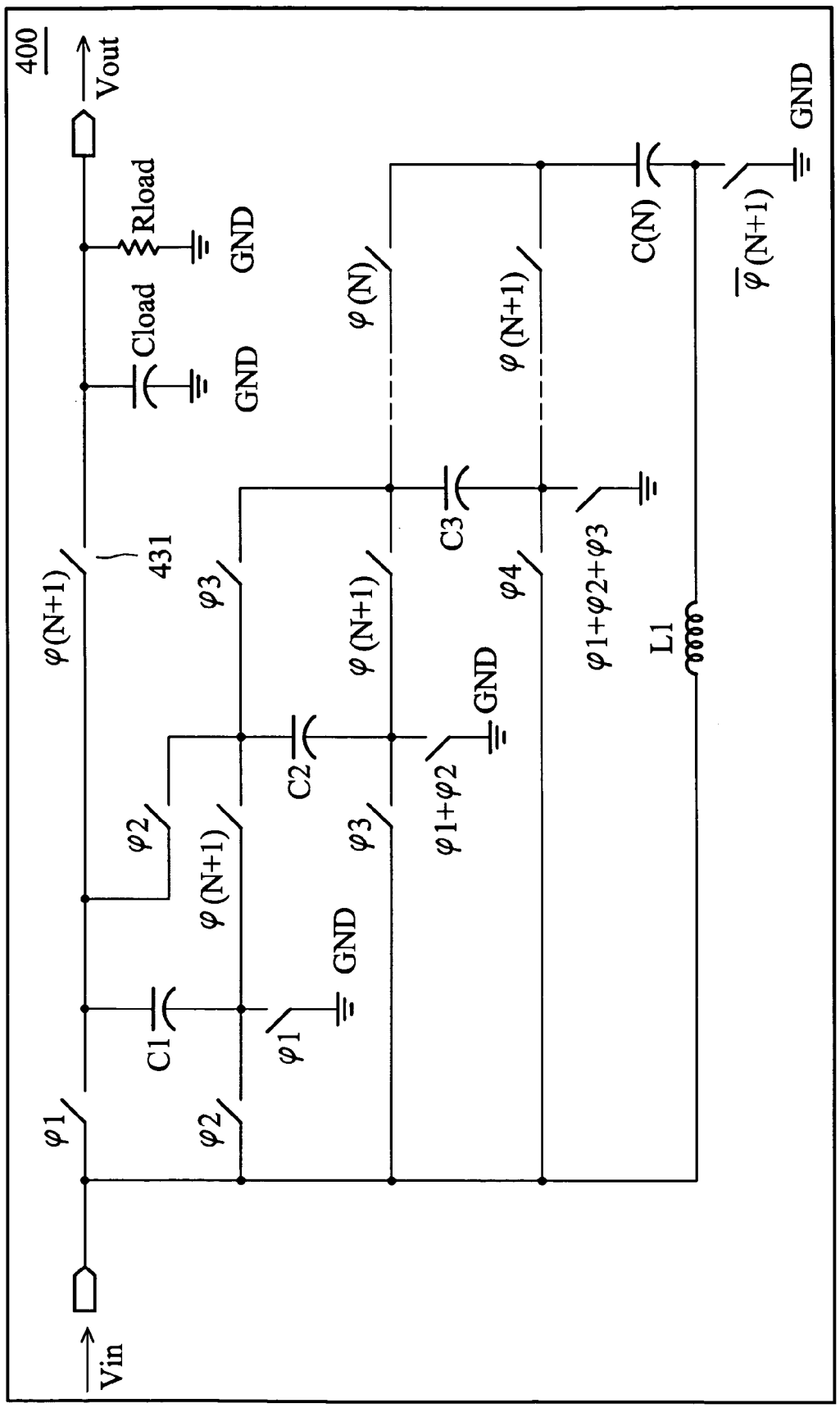
FIG. 4 shows a MMVLC according to another embodiment of the invention.

FIG. 4 is MMVLC 400 according to another embodiment of the invention. Unlike MMVLC 200, here, diode 231 is replaced by switch 431. Switch 431, controlled by control signal φ(N+1) is turned on when control signal φ(N+1) is at high voltage level. Other operations of MMVLC 400 are similar to those of MMVLC 200.

Figure 5:
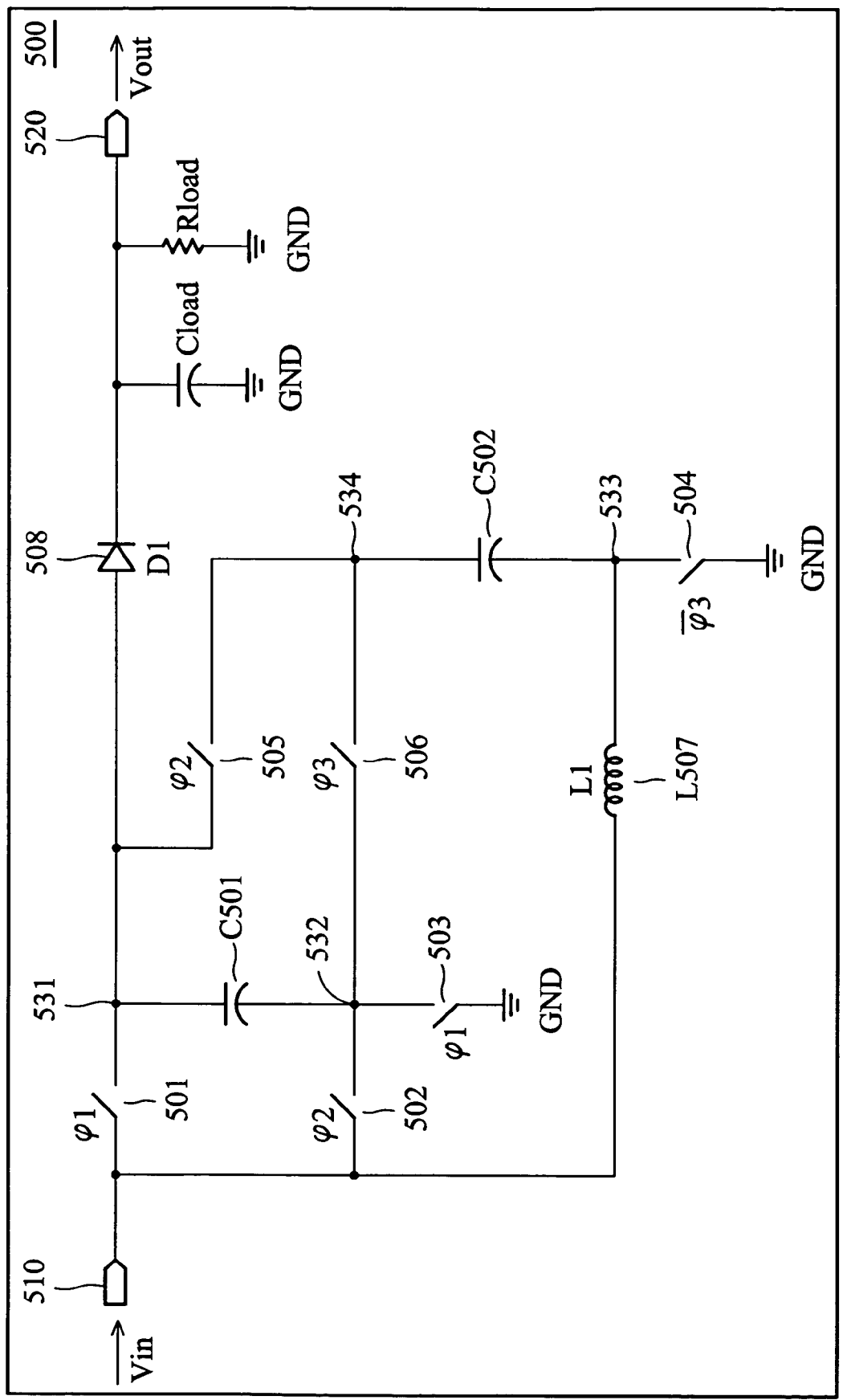
FIG. 5 shows two stage multiphase voltage lifter converter 500 based on MMVLC of FIG. 2.

FIG. 5 shows a two stage multiphase voltage lifter converter 500 of FIG. 2. Two stage multiphase voltage lifter converter 500 comprises input terminal 510 receiving a DC input voltage Vin, output terminal 520 outputting an output voltage Vout, switch 501 coupled between node 531 and input terminal 510, switch 502 coupled between input terminal 510 and node 532, C501 coupled between node 531 and node 532, switch 503 coupled between node 532 and ground GND, switch 504 coupled between node 533 and ground GND, inductor L507 coupled between node 533 and input terminal 510, load resistor $R_{load}$ coupled between ground GND and output terminal 520, load capacitor $C_{load}$ coupled between ground GND and output terminal 520, diode 508 coupled between node 531 and output terminal 520, capacitor C502 coupled between node 533 and node 534, switch 505 coupled between node 531 and node 534, and switch 506 coupled between node 532 and node 534.

Switch 501 and switch 503 are turned on when control signal φ1 is at high voltage level, switch 502 and switch 505 are turned on when control signal φ2 is at high voltage level, switch 506 is turned on and diode 508 is conductive when control signal φ3 is at high voltage level, and switch 504 is turned off when control signal φ3 is at low voltage level.

Figure 6:
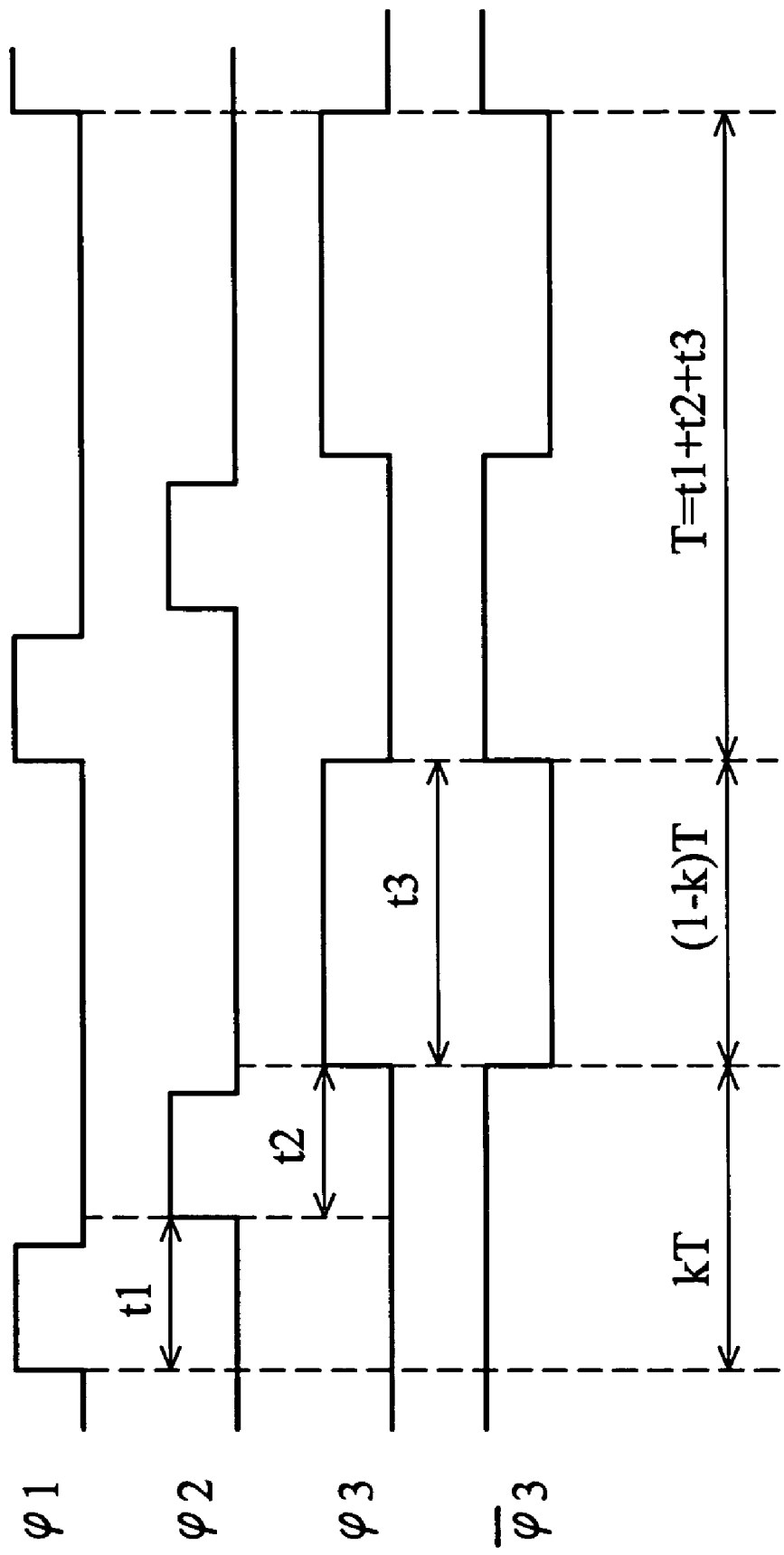
FIG. 6 is a timing diagram illustrating control signals (φ1, φ2, φ3, $\overline{\phi}$(3)) of two stage, multiphase voltage lifter converter of FIG. 5.

FIG. 6 is a timing diagram illustrating control signals φ1, φ2, φ3, $\overline{φ}$(3)) of two stage multiphase voltage lifter converter 500. Switches having a control signal φ1 are turned on when control signal φ1 is at high voltage level. As are other switches turned on when their respective control signals are at high voltage level. Control signal (φ1 or φ2) may be at high voltage level (phase 1 or phase 2) as long as one duration (t1 or t2) or shorter than one duration (t1 or t2). As shown in FIG. 6, durations (t1 and t2) are equal, while duration t(3) may be equal, shorter or longer than durations (t1 and t2). Switch-on period KT is equal to t1+t2. Switch-off period (1−K)T is equal to t3. Period T is equal to t1+t2+t3.

Figure 7:
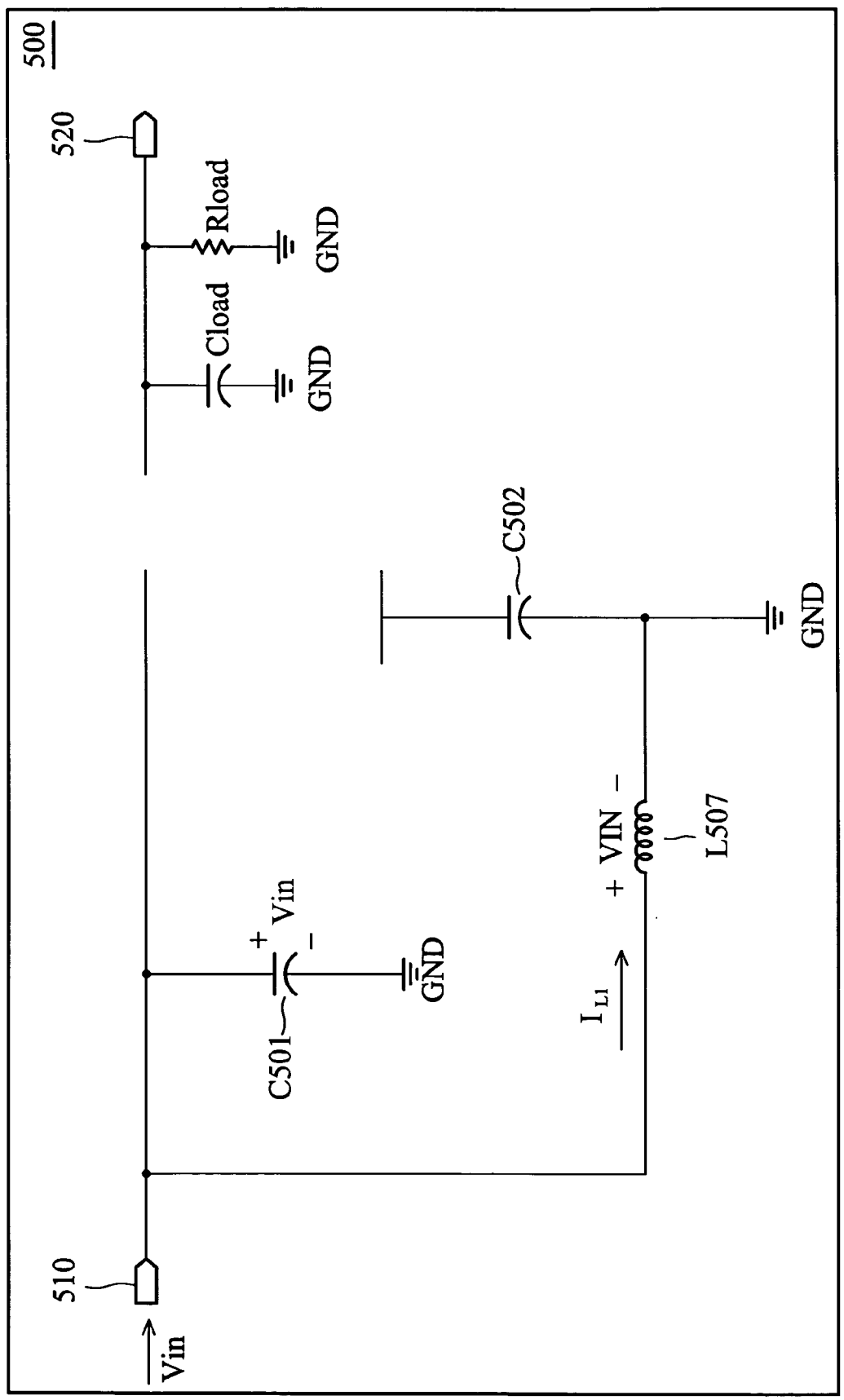
FIG. 7 shows two stage multiphase voltage lifter converter of FIG. 5 when control signal φ1 is at high voltage level.

FIG. 7 shows two stage multiphase voltage lifter converter 500 when control signal φ1 is at high voltage level (phase 1). Because switches (501 and 503), controlled by control signal φ1, are turned on, capacitor C501 is charged to reach a voltage level equal to input voltage Vin at phase 1 (phase 1 may be shorter than duration t1). Due to switches (505 and 506) being turned off and switch 504 turned on, the top plate of capacitor C502 is floated and the bottom plate of capacitor C502 is connected to ground GND. Because the voltage across diode 508 is not high enough, diode 508 is non-conductive. Current $I_{L1}$ through inductor L507 increases with time.

Figure 8:
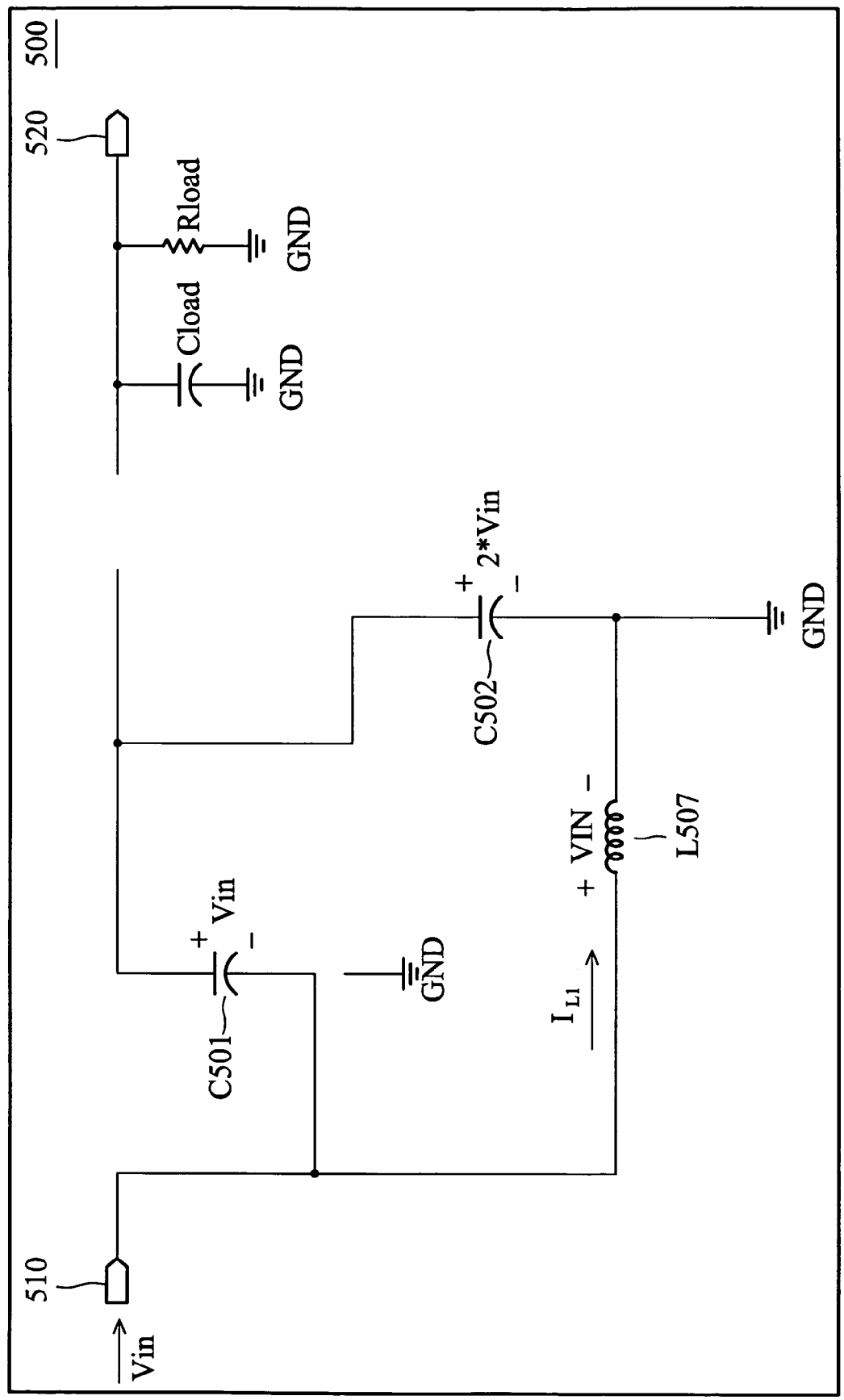
FIG. 8 shows two stage multiphase voltage lifter converter of FIG. 5 when control signal φ2 is at high voltage level.

FIG. 8 shows two stage multiphase voltage lifter converter 500 when control signal φ2 is at high voltage level (phase 2). Switches (502 and 505) controlled by control signal φ2 are turned on, connecting the bottom plate of capacitor C501 to input terminal while the top plate of capacitor C501 is connected to the top plate of capacitor C502. The bottom plate of C502 is connected to ground GND charging capacitor C502 until reaching a voltage equal to twice input voltage 2 Vin. Current $I_{L1}$ is still increasing with time. Because voltage across diode 508 is not high enough, diode 508 is still non-conductive.

Figure 9:
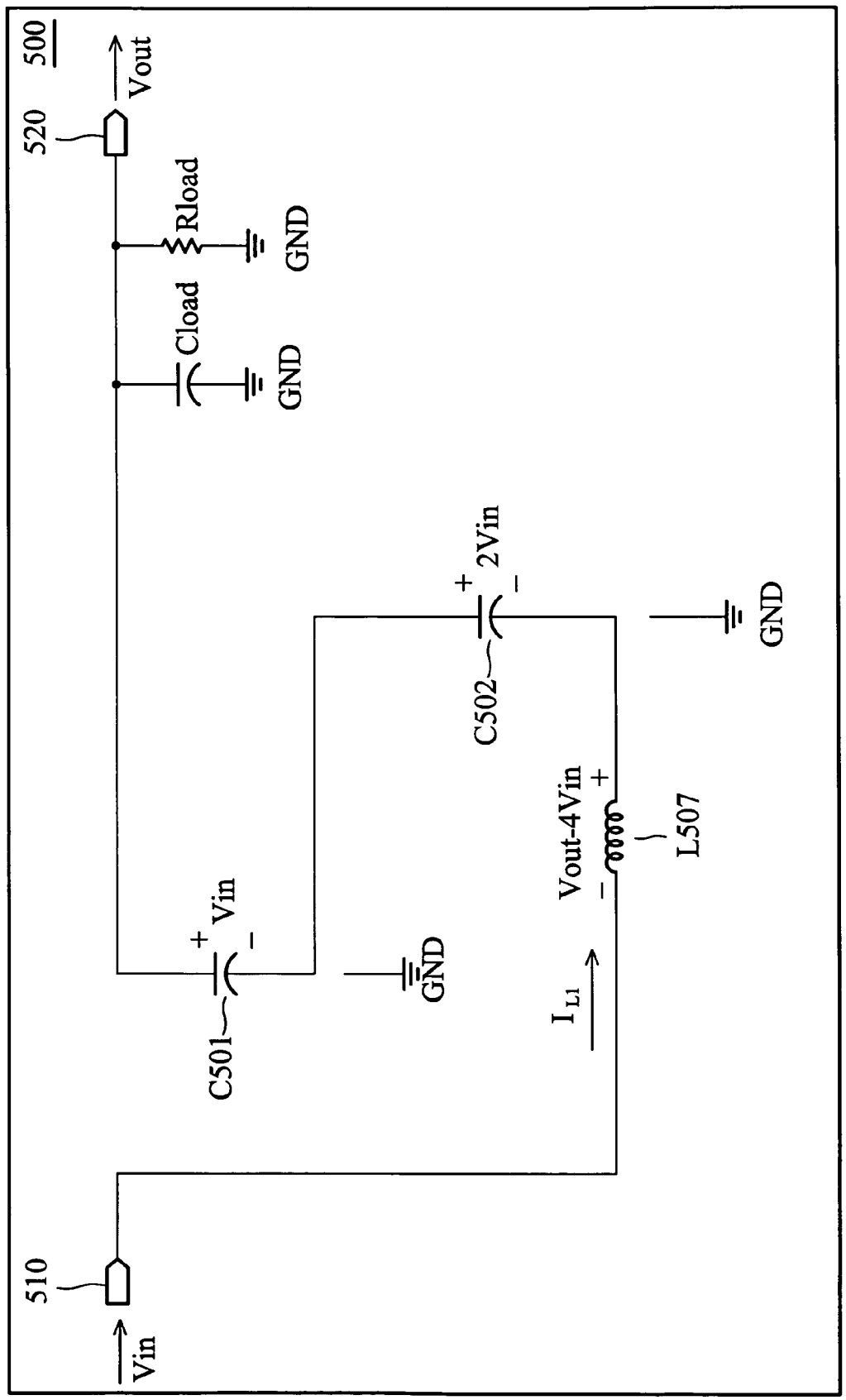
FIG. 9 shows two stage multiphase voltage lifter converter of FIG. 5 when control signal φ3 is at high voltage level.

FIG. 9 shows two stage multiphase voltage lifter converter 500 when control signal φ3 is at high voltage level (phase 3). Switch 504, controlled by control signal $\overline{φ}$(3), is turned off. Switch 506, controlled by control signal φ3, is turned on connecting the bottom plate of capacitor C502 to inductor L507 while the top plate of capacitor C502 is connected to the bottom plate of capacitor C501. The top plate of C501 is connected to output terminal. Current $I_{L1}$ flowing through inductor L507 increases with voltage Vin during switch-on period KT and decreases with voltage−(Vout−4 Vin) during switch-off period (1−k)T. The ripple of current $I_{L1}$ is $$\Delta i_{L1} = \frac{Vin}{L507}kT = \frac{Vout - 4Vin}{L507}(1-k)T.$$

The voltage transfer gain is $$A_v = \frac{Vout}{Vin} = \frac{4-3k}{1-k}.$$

If K=0.5, the voltage transfer gain $A_v$, is 5.

Figure 10:
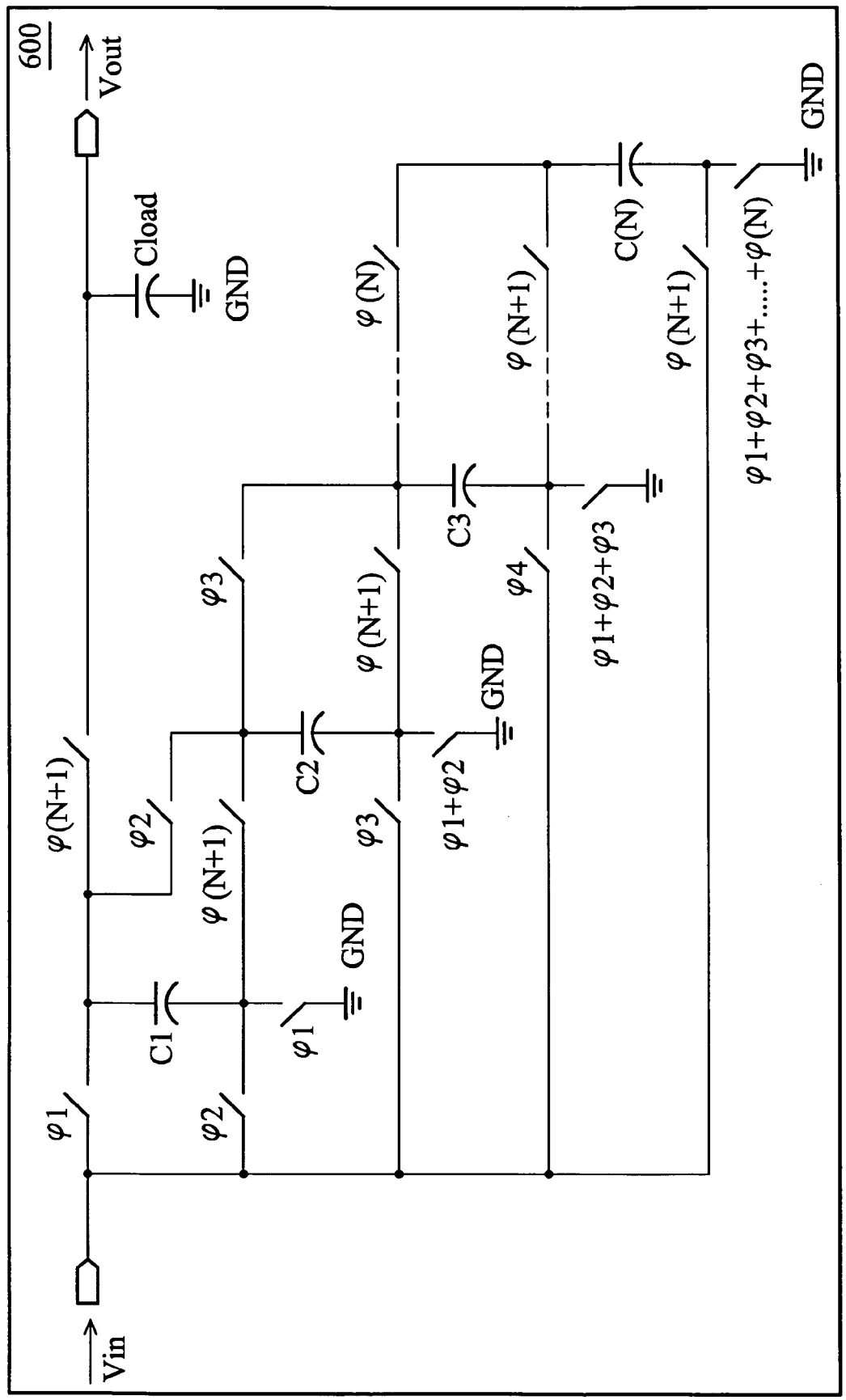
FIG. 10 shows multiphase multistage single frequency charge pump (MMSFCP) according to another embodiment of the invention.

FIG. 10 shows multiphase multistage single frequency charge pump (MMSFCP) 600 according to another embodiment of the invention. MMSFCP 600 comprises N capacitors (C1, C2, C3 . . . C(N)), loading capacitor $C_{load}$, and 4N switches. The voltage transfer gain Av of MMSFCP 600 is $$Av = \frac{N(N+1)}{2} + 1 \text{ in } (N+1) \text{ phases}$$

where the minimum N is two.

Figure 11:
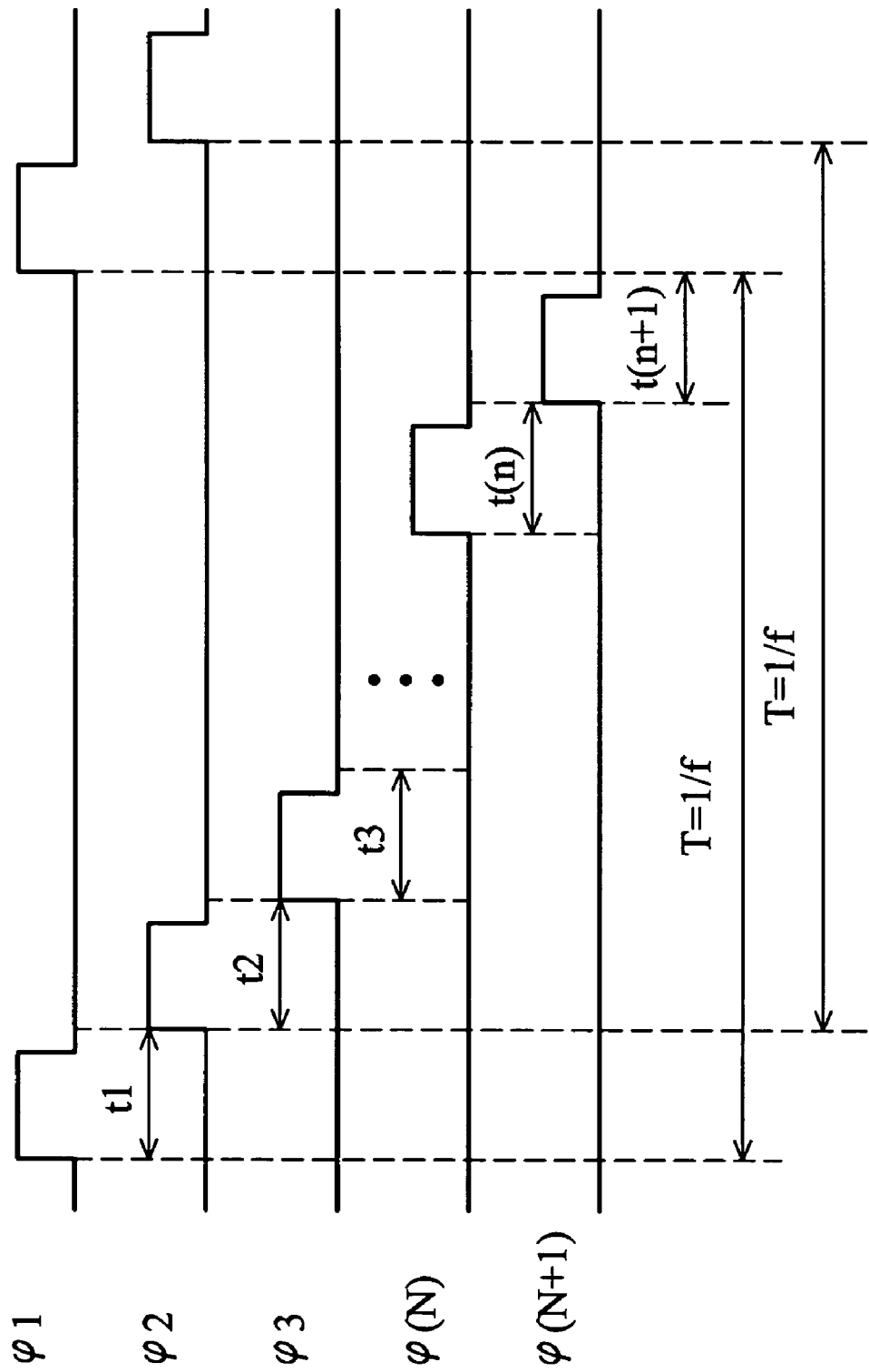
FIG. 11 is a timing diagram illustrating control signals (φ1, φ2, φ3 ... φ(N), φ(N+1)) of MMSFCP of FIG. 10.

FIG. 11 is a timing diagram illustrating control signals φ1, φ2, φ3 . . . φ(N), φ(N+1)) of MMSFCP 600. The switches controlled by control signal φ1 are turned on when control signal φ1 is at high voltage level, as are other switches, turned on when their respective control signals are at high voltage level. Control signal φ1, φ2, φ3 . . . φ(N), or φ(N+1)) may be at high voltage level (phase 1, phase 2 . . . , or phase (N+1)) as long as one duration (t1, t2, t3 . . . , or t(n)) or may be shorter than one duration (t1, t2, t3 . . . , or t(n)). As shown in FIG. 11, durations (t1, t2, t3 . . . t(n), t(n+1)), are all equal and periods T (T=1/f) of all control signals (φ1, φ2, φ3 . . . φ(N), φ(N+1)) are all equal makeing MMSFCP 600 a single frequency charge pump.

Figure 12:
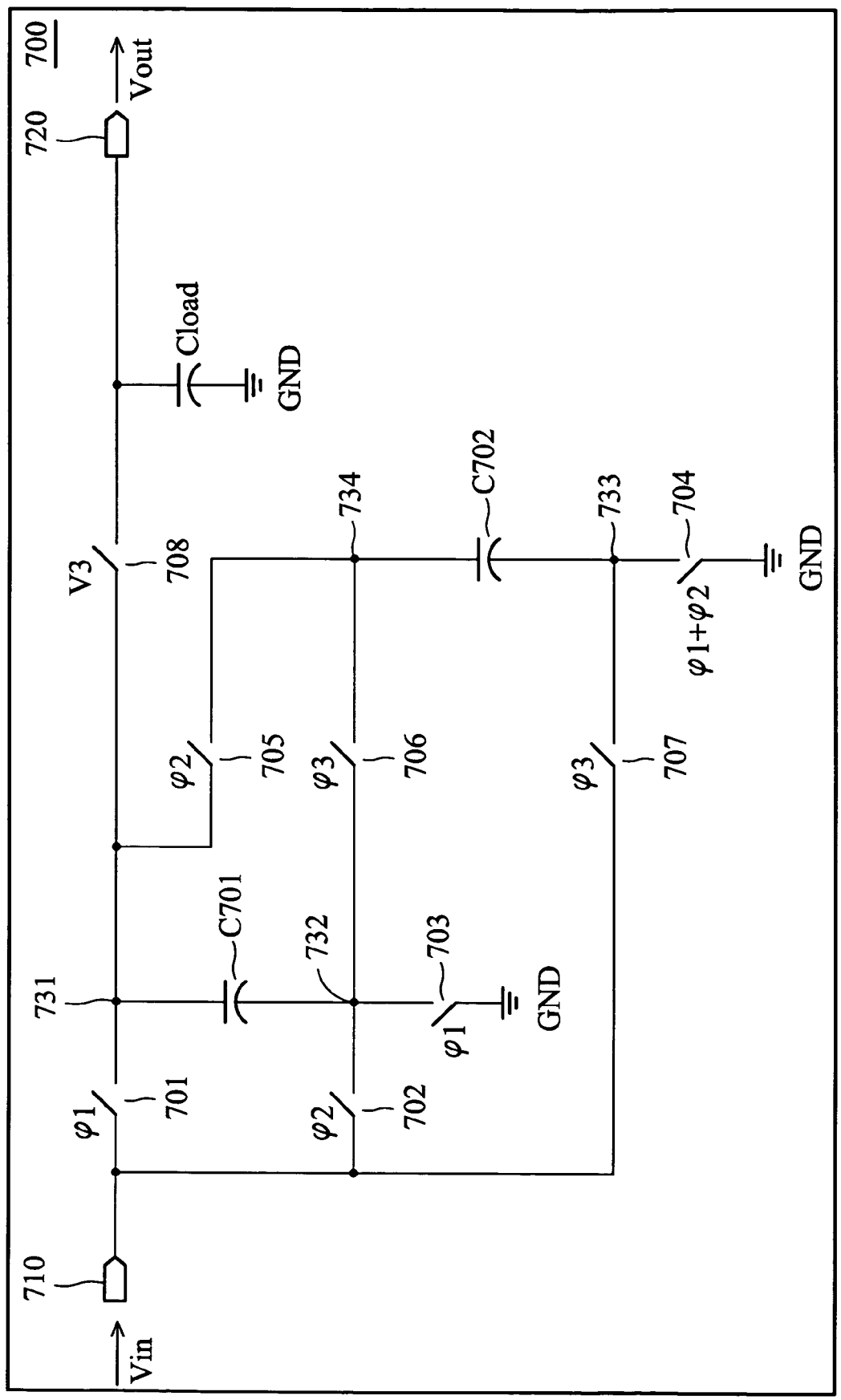
FIG. 12 shows a two stage multiphase charge pump circuit based on MMSFCP of FIG. 10.

FIG. 12 shows two stage multiphase charge pump circuit 700 based on MMSFCP 600. Two stage multiphase charge pump circuit 700 comprises input terminal 710 receiving a DC input voltage Vin, output terminal 720 outputting an output voltage Vout, switch 701 coupled between node 731 and input terminal 710, switch 702 coupled between input terminal 710 and node 732, capacitor C701 coupled between node 731 and node 732, switch 703 coupled between node 732 and ground GND, switch 704 coupled between node 733 and ground GND, switch 707 coupled between node 733 and input terminal 710, load capacitor $C_{load}$ coupled between ground GND and output terminal 720, switch 708 coupled between node 731 and output terminal 720, capacitor C702 coupled between node 733 and node 734, switch 705 coupled between node 731 and node 734, and switch 706 coupled between node 732 and node 734.

Switch 701 and switch 703 are turned on when control signal φ1 is at high voltage level, switch 702 and switch 705 are turned on when control signal φ2 is at high voltage level, switch 706, switch 707 and switch 708 are turned on when control signal is at high voltage level, and switch 704 is turned on during durations t1 and t2.

Figure 13:
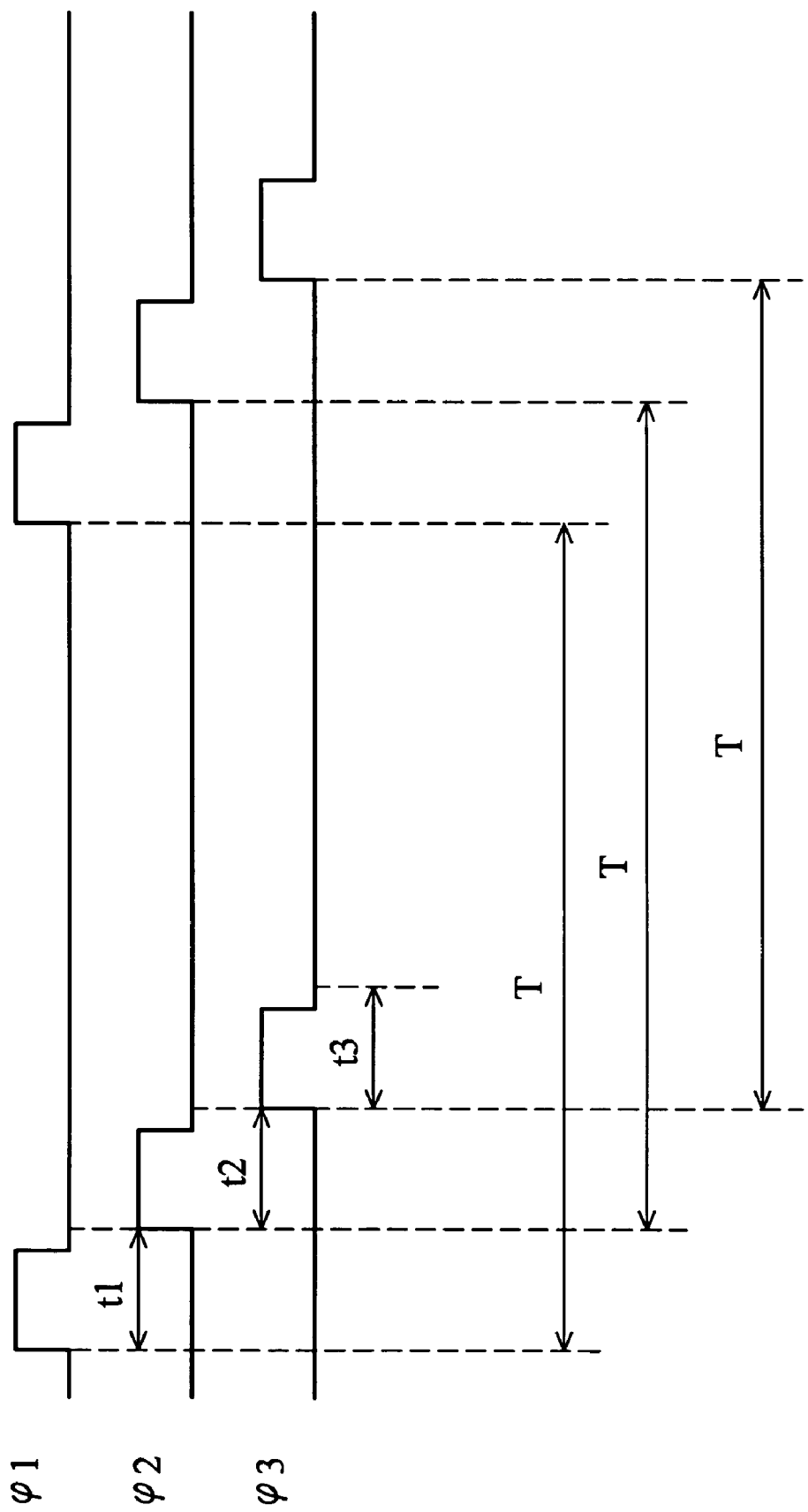
FIG. 13 is a timing diagram illustrating control signal (φ1, φ2, φ3) of MMSFCP of FIG. 12.

FIG. 13 is a timing diagram illustrating control signal φ1, φ2, φ3) of MMSFCP 700. Switches having control signal φ1 are turned on when control signal φ1 is at high voltage level. As are other switches turned on when their respective control signals are at high voltage level. Control signal (φ1 or φor φ2) may be at high voltage level (phase 1 or phase 2) as long as one duration (t1 or t2) or shorter than one duration (t1 or t2). As shown in FIG. 6, durations (t1, t2 and t3): are all equal and periods T (T=1/f) of all control signals (φ1, φ2 and φ3) are all equal.

Figure 14:
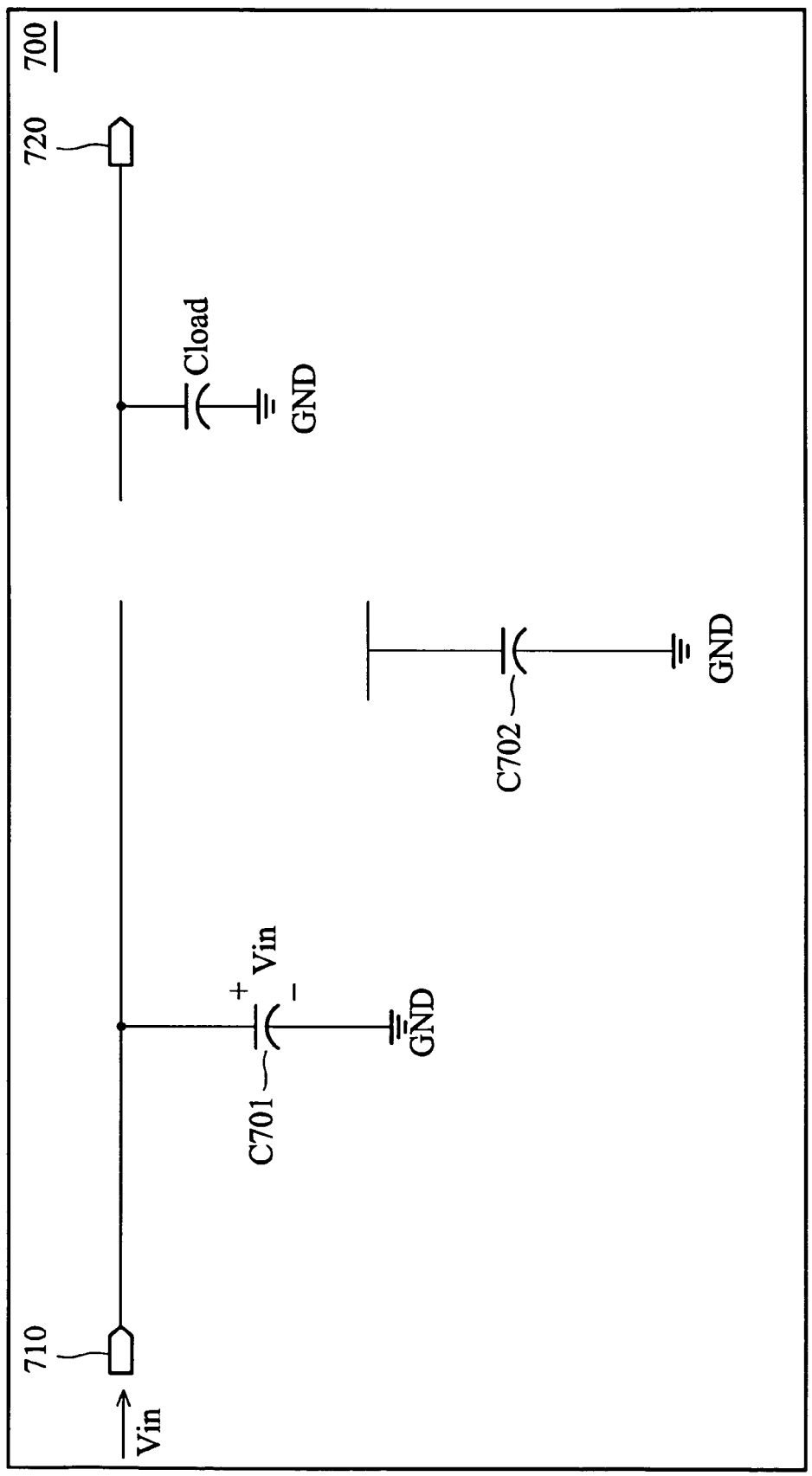
FIG. 14 shows a two stage multiphase charge pump circuit of FIG. 12 when control signal φ1 is at high voltage level.

FIG. 14 shows two stage multiphase charge pump circuit 700 when control signal φ1 is at high voltage level (phase 1). Because switches (701 and 703) controlled by control signal φ1 are turned on, the top plate of capacitor C701 is connected to input terminal 710 and the bottom plate of capacitor C701 is connected to ground GND. Capacitor C701 is charged to reach a voltage level equal to input voltage Vin at phase 1 (phase 1 may be shorter than duration t1). Due to switches (705 and 706) being turned off and switch 704 being turned on, the top plate of capacitor C702 is floated and the bottom plate of capacitor C502 is connected to ground GND. Switch 708 controlled by control signal φ3 is turned off.

Figure 15:
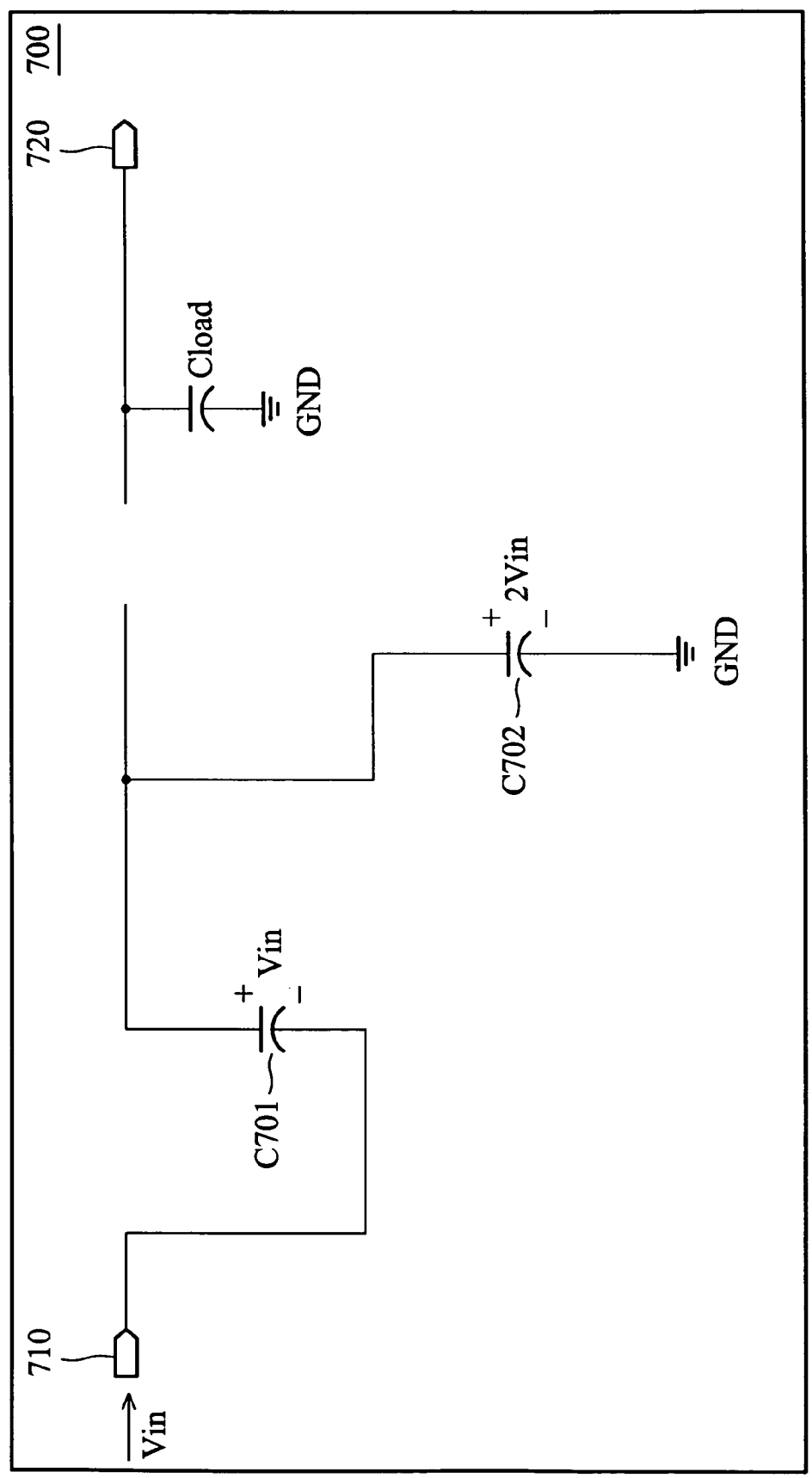
FIG. 15 shows two stage multiphase charge pump circuit of FIG. 12 when control signal φ2 is at high voltage level.

FIG. 15 shows two stage multiphase charge pump circuit 700 when control signal φ2 is at high voltage level (phase 2). Due to switches (702 and 705) being turned on, the bottom plate of capacitor C701 is connected to input terminal while the top plate of capacitor C701 is connected to the top plate of capacitor C702. Due to switch 704 being turned on, the bottom plate of capacitor C702 is connected to ground GND. Capacitor C702 is charged to reach a voltage level equal to two times input voltage 2 Vin.

Figure 16:
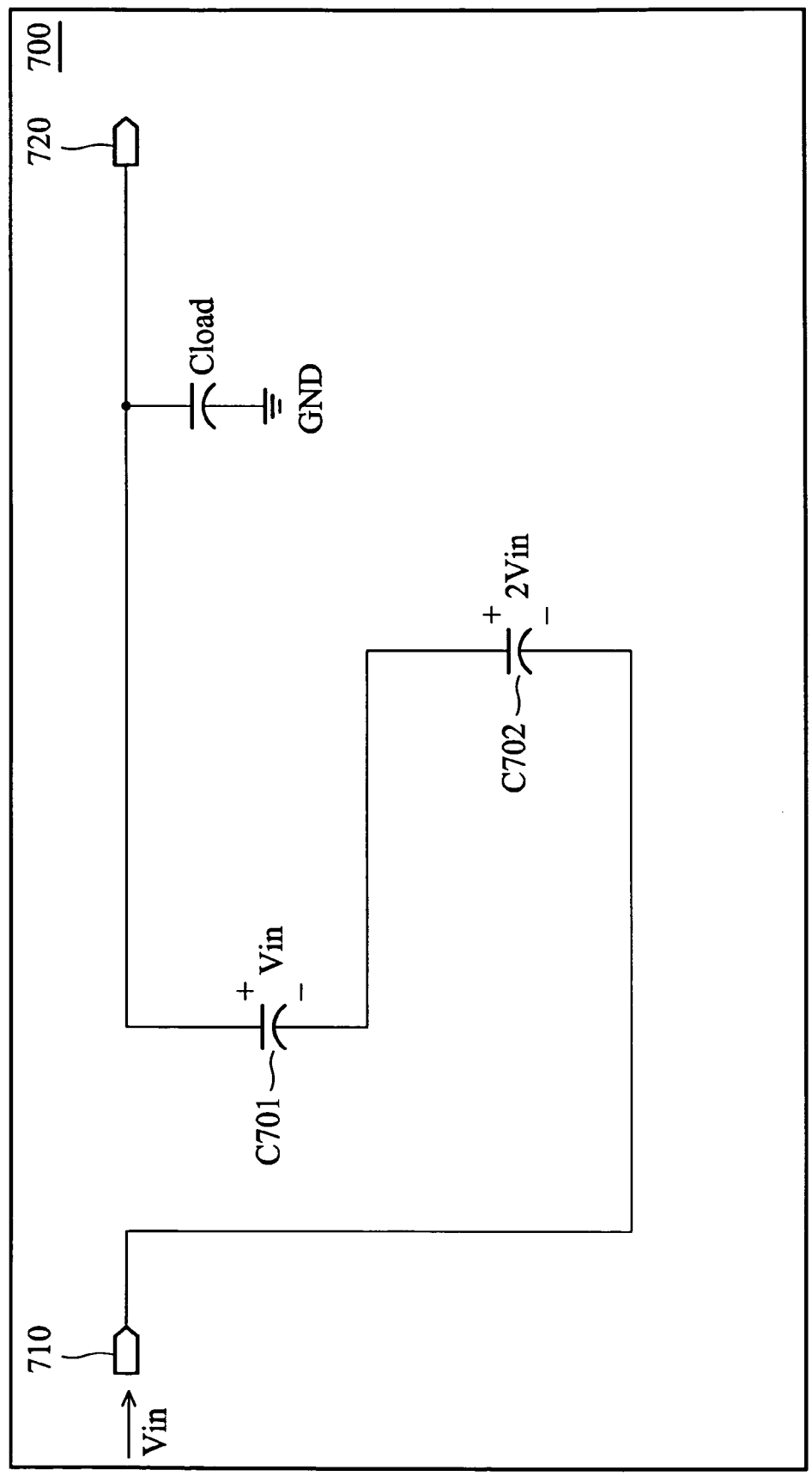
FIG. 16 shows two stage multiphase charge pump circuit of FIG. 12 when control signal φ3 is at high voltage level.

FIG. 16 shows two stage multiphase charge pump circuit 700 when control signal φ3 is at high voltage level (phase 3). Switches (707 and 708), controlled by control signal φ3, are turned on. The bottom plate of capacitor C702 is connected to input terminal 710 while the top plate of capacitor C702 is connected to the bottom plate of capacitor C701. The top plate of capacitor C701 is connected to the load capacitor $C_{load}$. Load capacitor $C_{load}$ is charged to reach a voltage level equal to four times input voltage 4 Vin. If input voltage Vin is 1V, output voltage Vout is 4V.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage converter, comprising:
   an input terminal receiving a DC input voltage;
   an output terminal outputting an output voltage;
   a first switch coupled between a first node and the input terminal;
   a second switch coupled between the input terminal and a second node;
   a first capacitor coupled between the first node and the second node;
   a third switch coupled between the second node and ground;
   a fourth switch coupled between a third node and ground;
   a first electrical device coupled between the third node and the input terminal;
   a load capacitor coupled between ground and the output terminal;
   a second electrical device coupled between the first node and the output terminal;
   a second capacitor coupled between the third node and a fourth node;
   a fifth switch coupled between the first node and the fourth node; and a sixth switch coupled between the second node and the fourth node.

2. The voltage converter as claimed in claim 1, wherein the first electrical device and the second electrical device are a seventh switch and an eighth switch respectively.

3. The voltage converter as claimed in claim 2, wherein the first switch and the third switch are turned on during a first period, the second switch and the fifth switch are turned on during a second period, the sixth switch, the seventh switch and the eighth switch are turned on during a third period, and the fourth switch is turned on during the first period and the second period.

4. The voltage converter as claimed in claim 3, wherein the first period, the second period and the third period progress with a first frequency.

5. The voltage converter as claimed in claim 3, wherein duration of the first, second, and third periods is the same.

6. The voltage converter as claimed in claim 1, wherein the first electrical device is an inductor, the second electrical device is a diode, and a load resistor is coupled between the output terminal and ground.

7. The voltage converter as claimed in claim 6, wherein the first switch and the third switch are turned on during a first period, the second switch and the fifth switch are turned on during a second period, the sixth switch is turned on and the diode is conducted during a third period, and the fourth switch is turned off during the third period.

8. The voltage converter as claimed in claim 7, wherein a fourth period KT is equal to the sum of the first period and the second period, a fifth period (1−K)T is equal to the third period, and the parameter K is less than 1.

9. The voltage converter as claimed in claim 8, wherein a gain of the voltage converter is $$\frac{4-3K}{1-K}.$$

10. A charge pump circuit, comprising:
an input terminal receiving a DC input voltage;
an output terminal outputting an output voltage;
a first switch coupled between a first node and the input terminal;
a second switch coupled between the input terminal and a second node;
a first capacitor coupled between the first node and the second node;
a third switch coupled between the second node and ground;
a fourth switch coupled between a third node and ground;
a first switch device coupled between the third node and the input terminal;
a load capacitor coupled between ground and the output terminal;
a second switch device coupled between the first node and the output terminal;
a second capacitor coupled between the third node and a fourth node;
a fifth switch coupled between the first node and the fourth node; and
a sixth switch coupled between the second node and the fourth node.

11. The voltage converter as claimed in claim 10, wherein the first switch and the third switch are turned on during a first period, the second switch and the fifth switch are turned on during a second period, the sixth switch, the first switch device and the second switch device are turned on during a third period, and the fourth switch is turned on during the first period and the second period.

12. The voltage converter as claimed in claim 11, wherein the first period, the second period and the third period progress with a first frequency.

13. The voltage converter as claimed in claim 11, wherein duration of the first, second, and third periods is the same.

14. A voltage lifter converter, comprising:
an input terminal receiving a DC input voltage;
an output terminal outputting an output voltage;
a first switch coupled between a first node and the input terminal;
a second switch coupled between the input terminal and a second node;
a first capacitor coupled between the first node and the second node;
a third switch coupled between the second node and ground;
a fourth switch coupled between a third node and ground;
an inductor coupled between the third node and the input terminal;
a load capacitor coupled between ground and the output terminal;
a load resistor coupled between ground and the output terminal;
a diode coupled between the first node and the output terminal;
a second capacitor coupled between the third node and a fourth node;
a fifth switch coupled between the first node and the fourth node; and
a sixth switch coupled between the second node and the fourth node.

15. The voltage lifter converter as claimed in claim 14, wherein the first switch and the third switch are turned on during a first period, the second switch and the fifth switch are turned on during a second period, the sixth switch is turned on and the diode is conducted during a third period, and the fourth switch is turned off during the third period.

16. The voltage lifter converter as claimed in claim 15, wherein a fourth period KT is equal to the sum of the first period and the second period, a fifth period (1−K)T is equal to the third period, and the parameter K is less than 1.

17. The voltage lifter converter as claimed in claim 16, wherein a gain of the voltage converter is $$\frac{4-3K}{1-K}.$$

* * * * *